(12) United States Patent　　　　(10) Patent No.:　US 12,593,241 B2

Sampathkumar　　　　　　　　　　　(45) Date of Patent:　　Mar. 31, 2026

(54) COMPUTERIZED SYSTEMS AND METHODS FOR NON-DISRUPTIVE CAC ON A NETWORK VIA MLO FUNCTIONALITY

(71) Applicant: PLUME DESIGN, INC., Palo Alto, CA (US)

(72) Inventor: Badri Srinivasan Sampathkumar, Fremont, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 334 days.

(21) Appl. No.: 18/224,603

(22) Filed: Jul. 21, 2023

(65) Prior Publication Data

US 2025/0031091 A1　　Jan. 23, 2025

(51) Int. Cl.
*H04W 28/02*　　(2009.01)
*H04W 28/082*　　(2023.01)
*H04W 28/086*　　(2023.01)

(52) U.S. Cl.
CPC ..... *H04W 28/0273* (2013.01); *H04W 28/082* (2023.05); *H04W 28/0861* (2023.05)

(58) Field of Classification Search
CPC . H04W 76/15; H04W 84/12; H04W 28/0273; H04W 28/082; H04W 28/0861; H04W 74/0816; H04W 72/541; H04W 24/10; Y02D 30/70
See application file for complete search history.

(56) References Cited

U.S. PATENT DOCUMENTS

| | | | | | |
|---|---|---|---|---|---|
| 12,349,216 | B2 * | 7/2025 | Chitrakar | .......... | H04W 28/0278 |
| 2020/0314920 | A1 * | 10/2020 | Seok | ................ | H04W 74/0808 |
| 2021/0212118 | A1 * | 7/2021 | Lu | ..................... | H04W 74/0816 |
| 2021/0266960 | A1 * | 8/2021 | Lu | ..................... | H04W 72/0453 |
| 2021/0377856 | A1 * | 12/2021 | Chu | ................. | H04W 52/0216 |
| 2021/0377915 | A1 * | 12/2021 | Lalam | .................. | H04W 72/02 |
| 2022/0132423 | A1 * | 4/2022 | Fang | .................... | H04W 28/06 |
| 2022/0312513 | A1 * | 9/2022 | Chitrakar | ............ | H04W 74/002 |
| 2023/0007572 | A1 * | 1/2023 | Patil | ..................... | H04W 76/15 |
| 2023/0076285 | A1 * | 3/2023 | Ko | .......................... | H04W 76/15 |
| 2023/0189023 | A1 * | 6/2023 | Nayak | ................... | H04W 36/28 |
| | | | | | 455/450 |
| 2023/0198825 | A1 * | 6/2023 | Park | ................. | H04W 72/0446 |
| | | | | | 370/336 |

(Continued)

OTHER PUBLICATIONS

International Search Report and Written Opinion to corresponding Int'l Appln. No. PCT/US24/38140, mailed Oct. 8, 2024 (11 pages).

*Primary Examiner* — Jung Liu
(74) *Attorney, Agent, or Firm* — Nicholas Martin; Greenberg Traurig, LLP

(57) ABSTRACT

Disclosed are systems and methods that provide a computerized network management framework that adaptively configures a network at a location to ensure connectivity and/or network services are maintained. The disclosed framework enables the implementation of multi-link operation (MLO) functionality within WiFi 7 enabled networks to implement non-disruptive channel availability check (CAC) capabilities. The framework can utilize MLO backup/redundant links that can mitigate network disruptions in service/connectivity for client devices that are WiFi 7 capable and utilize MLO functionality by diverting network traffic to an activated MLO link while an available channel/radio (e.g., 5 GHz) is used to perform the CAC operations.

20 Claims, 7 Drawing Sheets

(56)  References Cited

U.S. PATENT DOCUMENTS

| | | | |
|---|---|---|---|
| 2023/0217492 A1* | 7/2023 | Garcia Rodriguez ...................... | H04W 74/0816 |
| | | | 370/329 |
| 2023/0361802 A1* | 11/2023 | Thakur .................... | H04B 1/44 |
| 2023/0379999 A1* | 11/2023 | Kim ..................... | H04B 7/0413 |
| 2024/0023017 A1* | 1/2024 | Park ................. | H04W 52/0216 |
| 2024/0031059 A1* | 1/2024 | Park ..................... | H04L 5/0092 |
| 2024/0106588 A1* | 3/2024 | Park ........................ | H04L 27/26 |
| 2024/0114346 A1* | 4/2024 | Patil ................. | H04W 72/0453 |
| 2024/0364367 A1* | 10/2024 | Wang ............... | H04L 25/03159 |
| 2024/0365213 A1* | 10/2024 | Desai ................... | H04W 48/16 |
| 2024/0365248 A1* | 10/2024 | Buhari ............. | H04W 52/0277 |
| 2025/0024539 A1* | 1/2025 | Koehler ............... | H04W 76/15 |
| 2025/0056600 A1* | 2/2025 | Selvanesan ........... | H04W 28/18 |
| 2025/0126646 A1* | 4/2025 | Selvanesan ....... | H04W 74/0808 |

* cited by examiner

Network Management Engine 200

Identification module 202

MLO module 206

CAC module 204

Connection module 210

300

302  Identify a connection between a set of devices on a network

304  Determine to perform CAC operations

306  Activate a MLO link associated with the connection

308  Offload network traffic of the set of devices to the active MLO link

310  Perform CAC operations

312  Upon completion of CAC operations, reallocate network traffic to an initial channel and render MLO link dormant

COMPUTERIZED SYSTEMS AND METHODS FOR NON-DISRUPTIVE CAC ON A NETWORK VIA MLO FUNCTIONALITY

FIELD OF THE DISCLOSURE

The present disclosure is generally related to network management, and more particularly, to a decision intelligence (DI)-based computerized framework for adaptively performing non-disruptive channel availability checks (CACs) for network channels using multi-link operation (MLO) functionality.

BACKGROUND

WiFi 7, also referred to as IEEE 802.11be, is the latest generation of wireless technology. CAC is a procedure performed respective to initiation of Wireless Fidelity (WiFi) Access Points, which can be operational on WiFi 7 networks.

SUMMARY OF THE DISCLOSURE

WiFi 7 is designed to provide faster speeds, lower latency and increased capacity compared to previous WiFi standards. Among other benefits, WiFi 7 can provide extreme high throughput (EHT), and can support multi-access point (AP) coordination (e.g., coordination and joint transmission.

WiFi 7 includes functionality to bond WiFi links across multiple radios/frequency bands together into a single multi-link device, which provides the ability to transmit packets destined for that endpoint via either of the constituent links. This ability translates to improved throughput performance and capacity since such metrics can now become additive amongst the constituent links. For example, WiFi 7 provides improved latency in traffic flows due to the ability to send traffic over the less congested link.

Different regulatory domains (Federal Communications Commission (FCC), European Telecommunications Standards Institute (ETSI), and the like) have different CAC (clearance) rules corresponding to the duration for which an AP has to monitor a channel in idle mode before clearing the channel for operation. Similarly, once an AP begins operating on a channel, the AP has to perform continuous In Service Monitoring (ISM) at a specified duty cycle to detect any radar events on the channel, upon which the AP can then reactively vacate the channel within a specified time constraint (which can be stipulated by specific regulatory rules) and move on to another channel.

Client devices connected to an AP can be notified via a protocol call Channel Switch Announcement (CSA) by the AP, which are adhered to in accordance with the client device moving to a new channel of operation. If the new channel of operation is another radar channel, the AP can perform a similar CAC check before starting operation.

As understood by those of skill in the art, the above procedural discussion typically leads to discontinuity in service in the network, which corresponds to the period of time the AP has to perform the CAC and/or announce the CSA and move on to the new operating channel.

To that end, as discussed herein, the disclosed system and methods provide a novel computerized network management framework that can utilize MLO redundant links that can mitigate network/service disruptions for client devices while CAC operations are performed.

Thus, according to some embodiments, the disclosed systems and methods provide a novel computerized network management framework that adaptively configures network connectivity for devices accessing and relying on WiFi network connections by utilizing MLO functionality for performing CAC and CSA operations. As discussed herein, in some embodiments, device connections can be offloaded and/or transferred to associated network channels/bands during CAC operations via MLO functionality, which can ensure that evolving runtime environments maintain their connectivity and integrity so as to prevent disruptions in service and/or connectivity on the network.

By way of a non-limiting example, according to some embodiments, as discussed herein, via two (2) network links in a MLO connection, and that CAC/CSA, inter alia, are specific to a 5 GHz band, the disclosed framework can utilize the 2.4 GHz frequency band (referred to as band, interchangeably) or the 6 GHz frequency band (e.g., in low power mode, since standard power mode in 6 GHz has other incumbents similar to radar and has to be checked using automated frequency coordination (AFC) methods before operation) to serve as a backup link on which the data traffic/connectivity service can continue while the 5 GHz radio is being used to perform CAC on the other channel to which the 5 GHZ AP is positioned to migrate to.

Accordingly, as discussed herein, the disclosed framework is configured to and operates to leverage the MLO links as a backup/redundancy link to divert traffic while an available channel/radio (e.g., 5 GHZ) is used to perform the CAC operations. Such functionality is enabled via the disclosed framework's capability to activate and deactivate MLO links to/from dormant and active states, as discussed herein.

It should be understood that while the discussion herein will focus on WiFi 7 networks at a location, it should not be construed as limiting, as any type of known or to be known type of network for which MLO functionality can be implemented can be utilized via the disclosed systems and methods without departing from the scope of the instant disclosure.

According to some embodiments, a method is disclosed for adaptively performing non-disruptive CAC for network channels using MLO functionality. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for adaptively performing non-disruptive CAC for network channels using MLO functionality.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
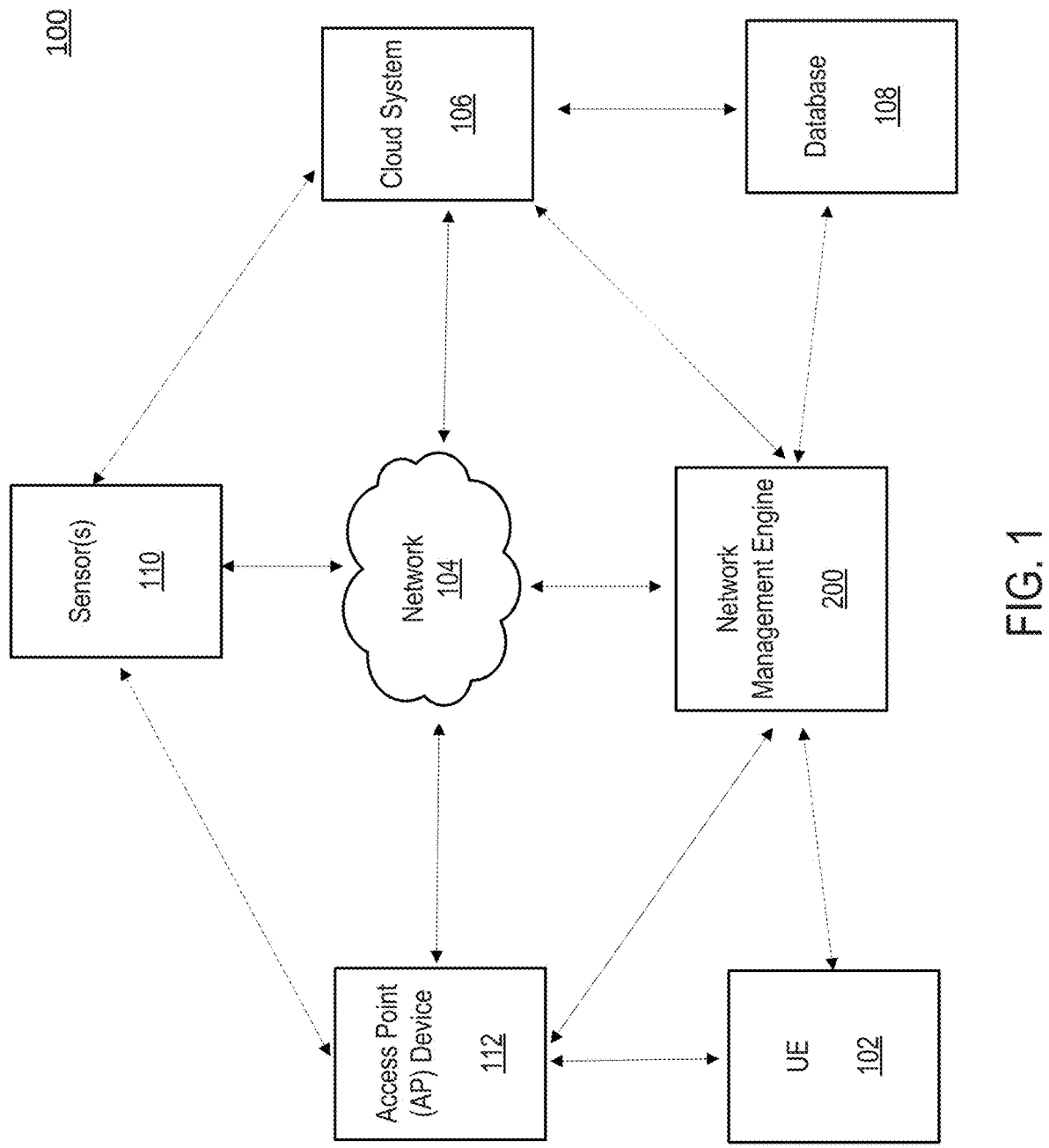
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the,"

again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1, system 100 is depicted which includes user equipment (UE) 102 (e.g., a client device, as mentioned above and discussed below in relation to FIG. 8), access point (AP) device 112, network 104, cloud system 106, database 108, sensors 110 and network management engine 200. It should be understood that while system 100 is depicted as including such components, it should not be construed as limiting, as one of ordinary skill in the art would readily understand that varying numbers of UEs, AP devices, peripheral devices, sensors, cloud systems, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, IoT device, wearable device, autonomous machine, and any other device equipped with a cellular or wireless or wired transceiver.

In some embodiments, peripheral devices (not shown) can be connected to UE 102, and can be any type of peripheral device, such as, but not limited to, a wearable device (e.g., smart watch), printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

According to some embodiments, AP device 112 is a device that creates and/or provides a wireless local area network (WLAN) for the location. According to some embodiments, the AP device 112 can be, but is not limited to, a router, switch, hub, gateway, extender and/or any other type of network hardware that can project a WiFi signal to a designated area. In some embodiments, UE 102 may be an AP device.

According to some embodiments, sensors 110 can correspond to any type of device, component and/or sensor associated with a location of system 100 (referred to, collectively, as "sensors"). In some embodiments, the sensors 110 can be any type of device that is capable of sensing and capturing data/metadata related to activity of the location. For example, the sensors 110 can include, but not be limited to, cameras, motion detectors, door and window contacts, heat and smoke detectors, passive infrared (PIR) sensors, time-of-flight (ToF) sensors, and the like. In some embodiments, the sensors can be associated with devices associated with the location of system 100, such as, for example, lights, smart locks, garage doors, smart appliances (e.g., thermostat, refrigerator, television, personal assistants (e.g., Alexa®, Nest®, for example)), smart phones, smart watches or other wearables, tablets, personal computers, and the like, and some combination thereof. For example, the sensors 110 can include the sensors on UE 102 (e.g., smart phone) and/or peripheral device (e.g., a paired smart watch). In some embodiments, sensors 110 can be associated with any device connected and/or operating on cloud system 106 (e.g., a cloud-based device, such as a server that collects information related to the location, for example).

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider, which has associated network resources hosted on the internet or private network (e.g., network 104), which enables (via engine 200) the network management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, AP device 112, sensors 110, and the services and applications provided by cloud system 106 and/or network management engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
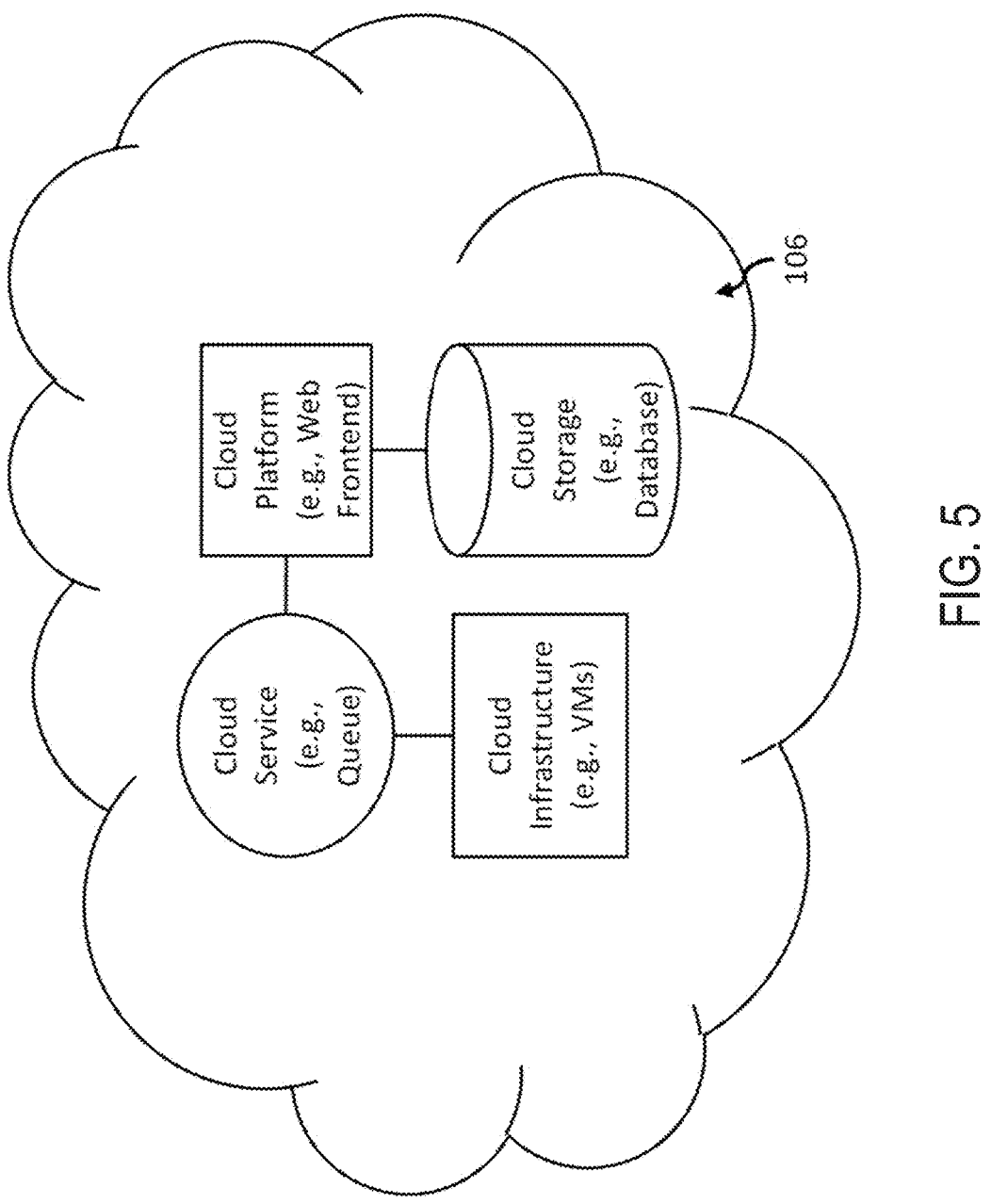
FIG. 5 depicts an exemplary implementation of an architecture according to some embodiments of the present disclosure.
Figure 6:
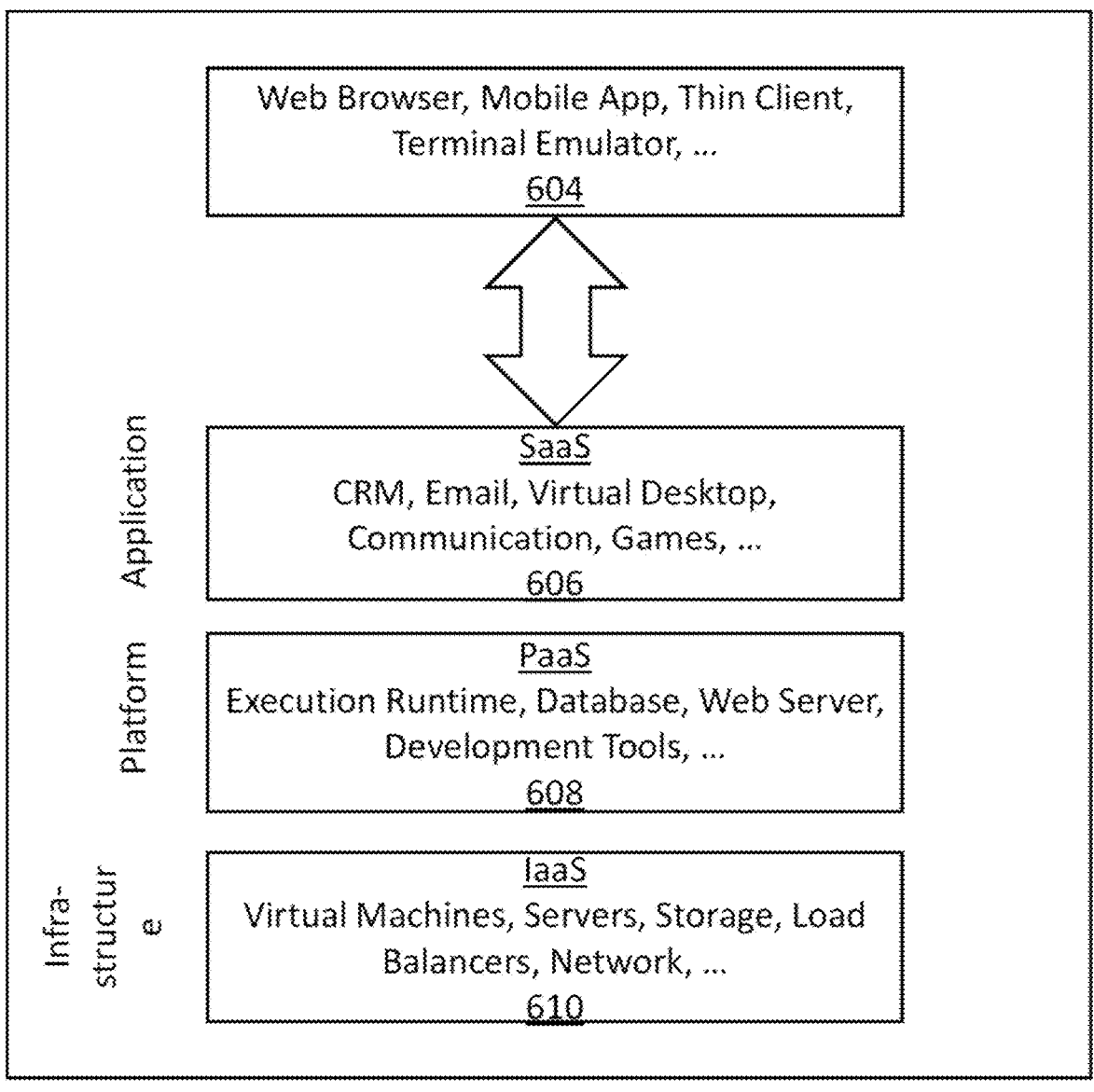
FIG. 6 depicts an exemplary implementation of an architecture according to some embodiments of the present disclosure.

Turning to FIGS. 5 and 6, in some embodiments, the exemplary computer-based systems/platforms, the exemplary computer-based devices, and/or the exemplary computer-based components of the present disclosure may be specifically configured to operate in a cloud computing/ architecture 106 such as, but not limiting to: infrastructure as a service (IaaS) 610, platform as a service (PaaS) 608, and/or software as a service (Saas) 606 using a web browser, mobile app, thin client, terminal emulator or other endpoint 604. FIGS. 5 and 6 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Network management engine 200, as discussed above and further below in more detail, can include components for the disclosed functionality. According to some embodiments, network management engine 200 may be a special purpose machine or processor, and can be hosted by a device on network 104, within cloud system 106, on AP device 112 and/or on UE 102. In some embodiments, engine 200 may be hosted by a server and/or set of servers associated with cloud system 106.

According to some embodiments, as discussed in more detail below, network management engine 200 may be configured to implement and/or control a plurality of services and/or microservices, where each of the plurality of services/microservices are configured to execute a plurality of workflows associated with performing the disclosed network management. Non-limiting embodiments of such workflows are provided below in relation to at least FIGS. 3-5.

According to some embodiments, as discussed above, network management engine 200 may function as an application provided by cloud system 106. In some embodiments, engine 200 may function as an application installed on a server(s), network location and/or other type of network resource associated with system 106. In some embodiments, engine 200 may function as an application installed and/or executing on AP device 112, UE 102 and/or sensors 110. In some embodiments, such application may be a web-based application accessed by AP device 112, UE 102 and/or devices associated with sensors 110 over network 104 from cloud system 106. In some embodiments, engine 200 may be configured and/or installed as an augmenting script, program or application (e.g., a plug-in or extension) to another application or program provided by cloud system 106 and/or executing on AP device 112, UE 102 and/or sensors 110.

Figure 2:
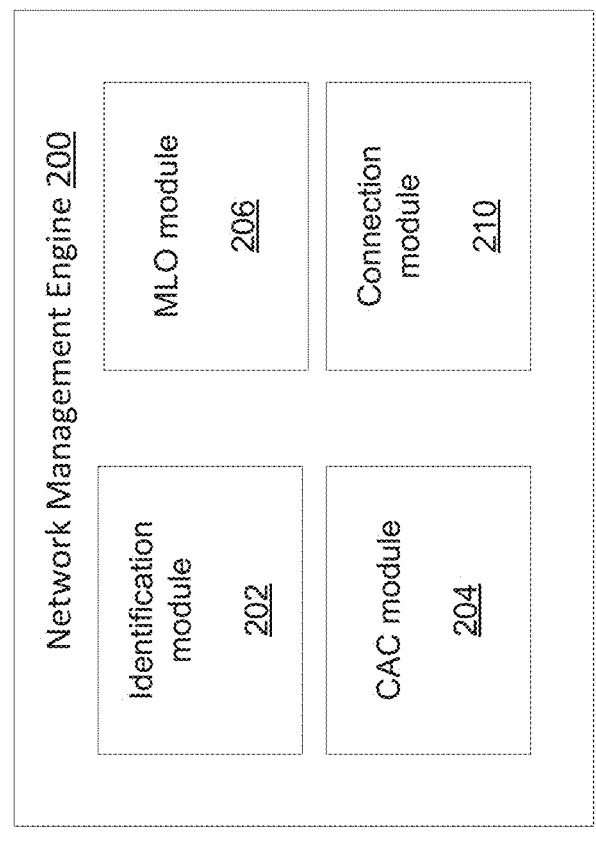
FIG. 2 is a block diagram illustrating components of an exemplary system according to some embodiments of the present disclosure.

As illustrated in FIG. 2, according to some embodiments, network management engine 200 includes identification module 202, CAC module 204, MLO module 206 and connection module 208. It should be understood that the engine(s) and modules discussed herein are non-exhaustive, as additional or fewer engines and/or modules (or submodules) may be applicable to the embodiments of the systems and methods discussed. More detail of the operations, configurations and functionalities of engine 200 and each of its modules, and their role within embodiments of the present disclosure will be discussed below.

Figure 3:
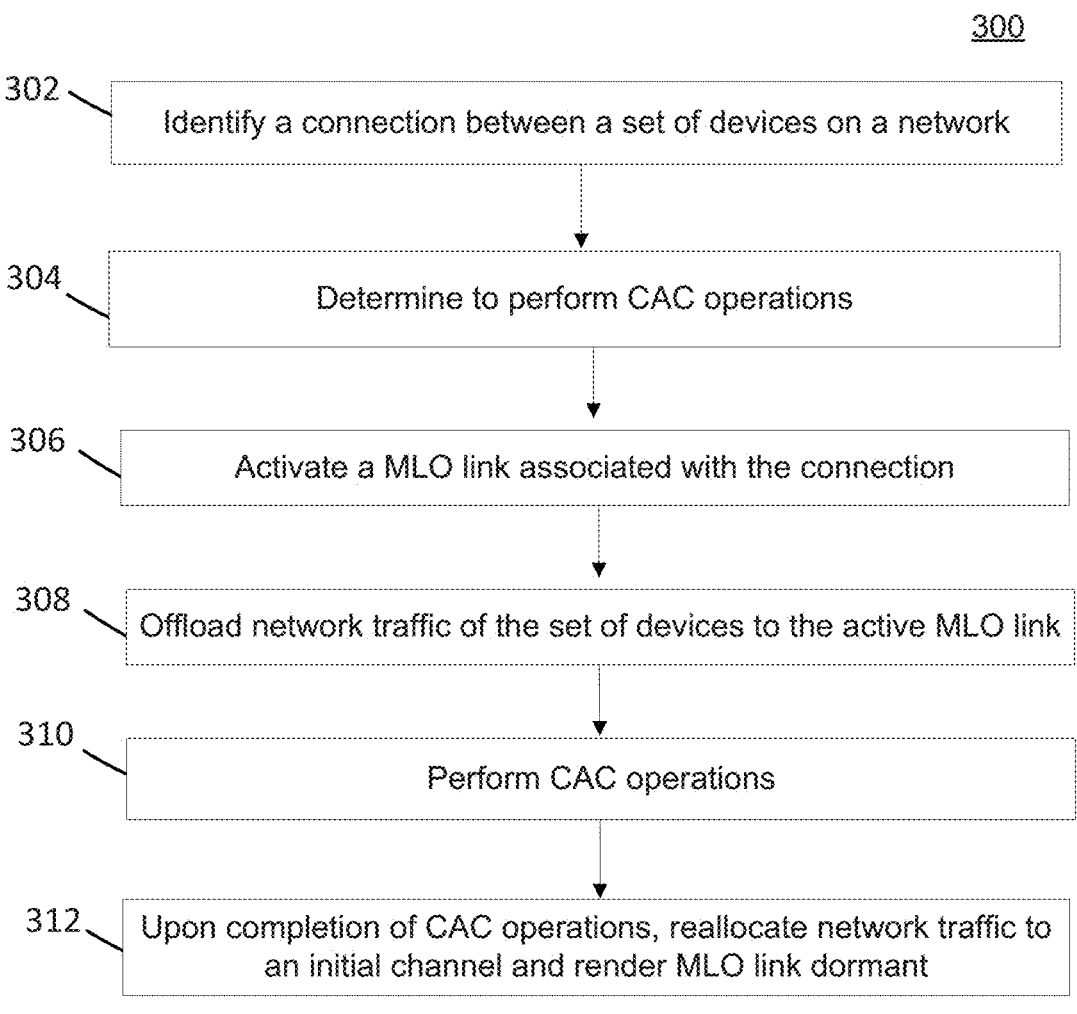
FIG. 3 illustrates an exemplary workflow according to some embodiments of the present disclosure.

Turning to FIG. 3, Process 300 provides non-limiting example embodiments for the disclosed network management framework. According to some embodiments, Process 300 provides the executable steps for performing non-disruptive CAC on network channels using MLO functionality, as discussed herein.

According to some embodiments, as discussed herein, the disclosed framework (e.g., via operations performed by engine 200) can proactively perform CAC operations on dynamic frequency selection (DFS)/radar channels on a WiFi 7 network, upon which such channels can be cleared for operation. As discussed above, such clearing and connectivity maintenance can be performed in compliance with applicable regulatory rules (e.g., ETSI in the European Union (EU)). In some embodiment, such processing can be performed in accordance with a criteria, which can be in accordance with, but not limited to, a predetermined time period (e.g., every 24 hours, for example), based on network traffic, number of connected devices, type of network, and the like, or some combination thereof.

Thus, in some embodiments, whenever network traffic is within certain limits that can be sustained by a network's 2.4 GHz link, the framework can operate to keep that link active and make the 5 GHz link dormant in an MLO connection. The framework can move the 5 GHz radio to the DFS/Radar channels and perform CAC (e.g., understood to be pre-CAC given the proactive operations to check radar channels for CAC before such MLO switching is performed). Accordingly, the MLO enabled CAC of the disclosed framework can prevent network disruption by offloading network channels to separate MLO links while CAC is performed on adjacent/associated MLO links.

According to some embodiments, in embodiments corresponding to regulatory domains (e.g., FCC) that required real-time or "just-in-time" (JIT) CAC clearance, the processing steps of Process 300 can be performed in a similar manner, as discussed supra and in more detail below. That is, in some embodiments, before starting operation, the framework can leverage another MLO link (e.g., 2.4 GHz or 6

GHz) and utilize the 5 GHz radio to move to the intended radar channel and perform CAC.

According to some embodiments, Step 302 of Process 300 can be performed by identification module 202 of network management engine 200; Steps 304 and 310 can be performed by CAC module 204; Steps 306 and 308 can be performed by MLO module 206; and Step 312 can be performed by connection module 208.

According to some embodiments, Process 300 begins with Step 302 where engine 200 can identify a network connection between a set of devices on a network. For example, as depicted in example network configuration 400 of FIG. 4, gateway 402 can provide network connectivity to UE 406 via extender 404. As discussed herein, the disclosed framework (e.g., via execution of engine 200, as discussed with reference to Process 300 of FIG. 3, infra) can dynamically activate MLO links across certain branches of a WiFi network's topology to enable CAC operations to be performed without causing a disruption to UE 406.

As discussed herein, MLO in WiFi networks refers to the ability of devices to simultaneously establish multiple connections to APs or routers. MLO can enable a device to use multiple WiFi radios and/or interfaces to establish concurrent connections with multiple APs or routers, effectively increasing the overall throughput and improving network performance. As such, a device can allocate, distribute and/or offload its network traffic across multiple connections, thereby utilizing the available bandwidth for CAC operations while ensuring device connectivity is maintained. According to some embodiments, as discussed herein, MLO can be implemented by, but not limited to, multi-channel operation, multi-radio operation, and the like, or some combination thereof.

Thus, with reference to FIG. 4, which will be discussed with reference to the steps of Process 300, the channels, antennas or radios utilized by gateway 402, extender 404 and/or UE 406 can evidence the implementation of MLO, whereby MLO links can be enacted and/or rendered dormant based on a stage, status and/or operation of CAC operations.

Figure 4:
FIG. 4 depicts a non-limiting example network environment according to some embodiments of the present disclosure.
Figure 4:
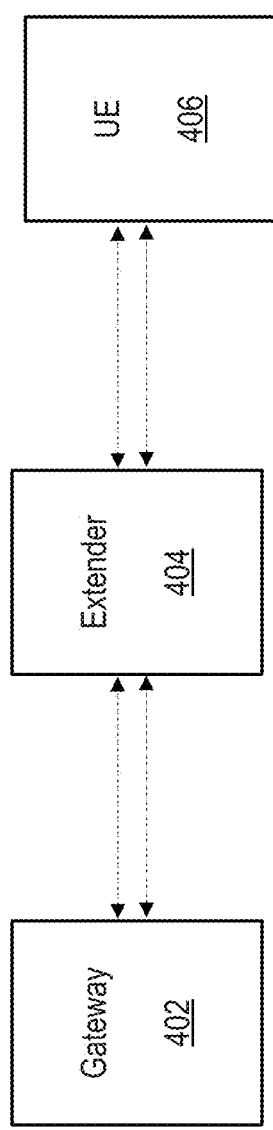

As depicted in FIG. 4, network configuration 400 (e.g., a WiFi 7 network) can implement MLO links between devices 402, 404 and 406. Thus, as depicted between gateway 402 and extender 404, and between extender 404 to UE 406, respectively, the dual dashed lines represent MLO links between each device (or node). The dashed lines represent different bands (or channels), which as discussed herein, can be dormant or activated.

For example, one of the dashed lines between extender 404 and UE 406 can correspond to a channel on a 2.4 GHz band, and the other line between that connection can correspond to a channel on a 5 GHz band. As discussed herein, when particular channels or bands are subject to CAC, a corresponding MLO link for that connection can be activated (from a dormant state) for offloading network traffic during such CAC operations. Upon completion of the CAC (and/or upon a predetermined time period after such CAC clearance is completed—e.g., 10 minutes, for example), traffic can be transferred back to the initial link, the MLO link is rendered dormant again.

While the depiction of FIG. 4 illustrates 3 devices, it should not be construed as limiting, as other types of network topologies (e.g., mesh networks, for example) and/or number of device connections can be implemented without departing from the scope of the instant disclosure. For example, in some example embodiments, UE 406 can be directly connected to gateway 402. Indeed, it should be understood that while the example in FIG. 4 related to the network of a location includes particular nodes and MLO link indicators (e.g., dashed lines), it should not be construed as limiting, as additional or fewer gateways, extenders, UEs and/or other types of APs can be included, as well as MLO links (not shown) being received by the gateway 402, without departing from the scope of the instant disclosure.

Thus, turning back to Step 302 of Process 300, engine 200 can identify a network connection of a UE (e.g., UE 402 to extender 404 and/or gateway 402, for example). In some embodiments, such identification can involve the collection of network data, which can include, but is not limited to, type of devices, number of devices in the connection to the AP, amount and/or type of network traffic, time, date, network type, identity (ID) of the MLO link, ID of the device, ID of a user, and the like, or some combination thereof. Such information can be stored in database 108, as discussed above.

In Step 304, engine 200 can determine to perform CAC operations. As discussed above, such CAC operations can be performed and/or based on particular regulatory compliance guidelines, and/or other factors including, but not limited to, a time, date, location, type of network, type of device, amount and/or type of network traffic or activity, and the like, or some combination thereof.

For example, if a UE is connected to a network in the EU, regulatory compliance via ETSI may require CAC clearance operations to be performed every 24 hours. Thus, for example, Step 304 can involve engine 200 monitoring the network according to such regulatory compliance guidelines (and/or based on such other factors as discussed above), and determine that CAC operations are to be performed.

In Step 306, based on the determination to perform CAC operations (in Step 304), engine 200 can identify a set of MLO links between the set of devices and activate the dormant MLO link. For example, with reference to FIG. 4, if the current channel/link being used by UE 406 to extender 404 is the 5 GHz band (from Step 302), then engine 200 can identify the other MLO link—for example, the 2.4 GHz band between such devices, as discussed above.

In Step 308, based on the CAC determination (in Step 304) and the activation of the MLO link (in Step 306), engine 200 can cause network traffic for the set of devices to be offloaded (or re-routed) to the active MLO link.

By way of a non-limiting example, continuing with the above example, upon determining CAC is to be performed (e.g., based on guidelines from ETSI, for example), the 2.4 GHZ channel for UE 406 can be activated (e.g., Step 306), whereby the network traffic occurring on the 5 GHZ link for UE 406 can be switched/re-routed/offloaded to the 2.4 GHz link (whereby, the 2.4 GHZ simultaneously processes/handles/hosts the network traffic while CAC operations are performed on the 5 GHz link, as discussed herein). According to some embodiments, engine 200 can configure the network components of the connected devices (e.g., UE 406 and extender 404/gateway 402) to a particular, modified configuration based on which channels, interfaces and/or antennas are available (e.g., MLO components of the network), as well as how frequent such channels, interfaces and/or antennas communicate and/or process network based information.

In Step 310, engine 200 can then function to perform and/or enable (e.g., execute or cause execution of) the CAC operations. According to some embodiments, CAC operations involved mechanisms used in WiFi networks to manage and control access to the wireless medium. CAC plays a crucial role in ensuring efficient and fair utilization of available network resources. In some embodiments, CAC operations can involve, but are not limited to, clear channel assessment (CCA) capabilities, energy detection (ED) capabilities, carrier sense multiple access with collision avoidance (CSMA/CA) capabilities, network allocation vector (NAV) capabilities, DFS capabilities, and the like, or some combination thereof.

In some embodiments, CCA capabilities can function to monitor a wireless channel to detect any ongoing transmissions or interference. CCA enables devices to determine if the channel is clear or busy before initiating data transmissions.

In some embodiments, ED capabilities involve techniques used in CCA to measure the energy level present in a wireless channel. For example, devices can listen for signals on the channel and check if the received energy exceeds a predefined threshold. If the energy level is below the threshold, the channel can be considered clear and available for transmission.

In some embodiments, CSMA/CA capabilities correspond to a protocol used to avoid collisions between wireless transmissions. For example, prior to initiating a data transmission, devices using CSMA/CA can listen to a wireless medium to check if it is idle. If the medium is busy, the devices can wait for a time period (e.g., a random amount of time or predetermined time period) and retry the process until the channel is clear. Such random backoff mechanisms can reduce collisions and can ensure fair access to the channel.

In some embodiments, NAV capabilities can correspond to a virtual timer maintained by devices in a WiFi network (e.g., gateway 402, for example). For example, when a device detects ongoing transmissions from other devices, such device can set the NAV timer to indicate the duration of the transmission. Other devices within range can then defer their transmission until the NAV timer expires, preventing collisions and allowing orderly access to the channel.

In some embodiments, DFS capabilities are based on regulatory compliance requirements for certain WiFi frequency bands, such as those used by 5 GHZ networks. In some embodiments, for example, DFS can require devices to perform additional checks on the channel before using it. In some embodiments, such DFS checks can involve detecting radar signals or other sources of interference, and if found, such devices can be caused to vacate the channel and select an alternative one to avoid interference.

Accordingly, CAC operations in a WiFi network ensure efficient utilization of the wireless medium, minimize collisions and provide fair access to network resources.

And, in Step 312, upon completion of the CAC operations, engine 200 can function to reallocate the network traffic back to the initial channel/band, whereby the MLO link utilized to host the network traffic during the CAC operations is rendered dormant. In some embodiments, such reallocation can occur upon completion of CAC operations and/or based upon a threshold time period upon completion of CAC operations (e.g., 1 minute in the United States or 10 minutes in the EU, for example). In some embodiments, the determination of the CAC operations' completion can be based on the criteria (from Step 304) for which the CAC operations are to be performed (e.g., regulatory compliance, for example) and/or based on the CAC operations themselves (as discussed above respective to Step 310).

By way of a non-limiting example, continuing with the above example, upon offloading the network traffic to the 2.4 GHZ MLO link, after completion of the CAC operations on the 5 GHz link, network traffic can be rerouted back to the 5 GHz link, whereby the 2.4 GHz link is then rendered dormant.

Accordingly, as discussed supra, the disclosed framework enables the implementation of MLO functionality within WiFi networks to implement non-disruptive CAC capabilities. The framework can utilize MLO backup/redundant links that can mitigate disruptions in service/connectivity for client devices while CAC operations are performed.

Figure 7:
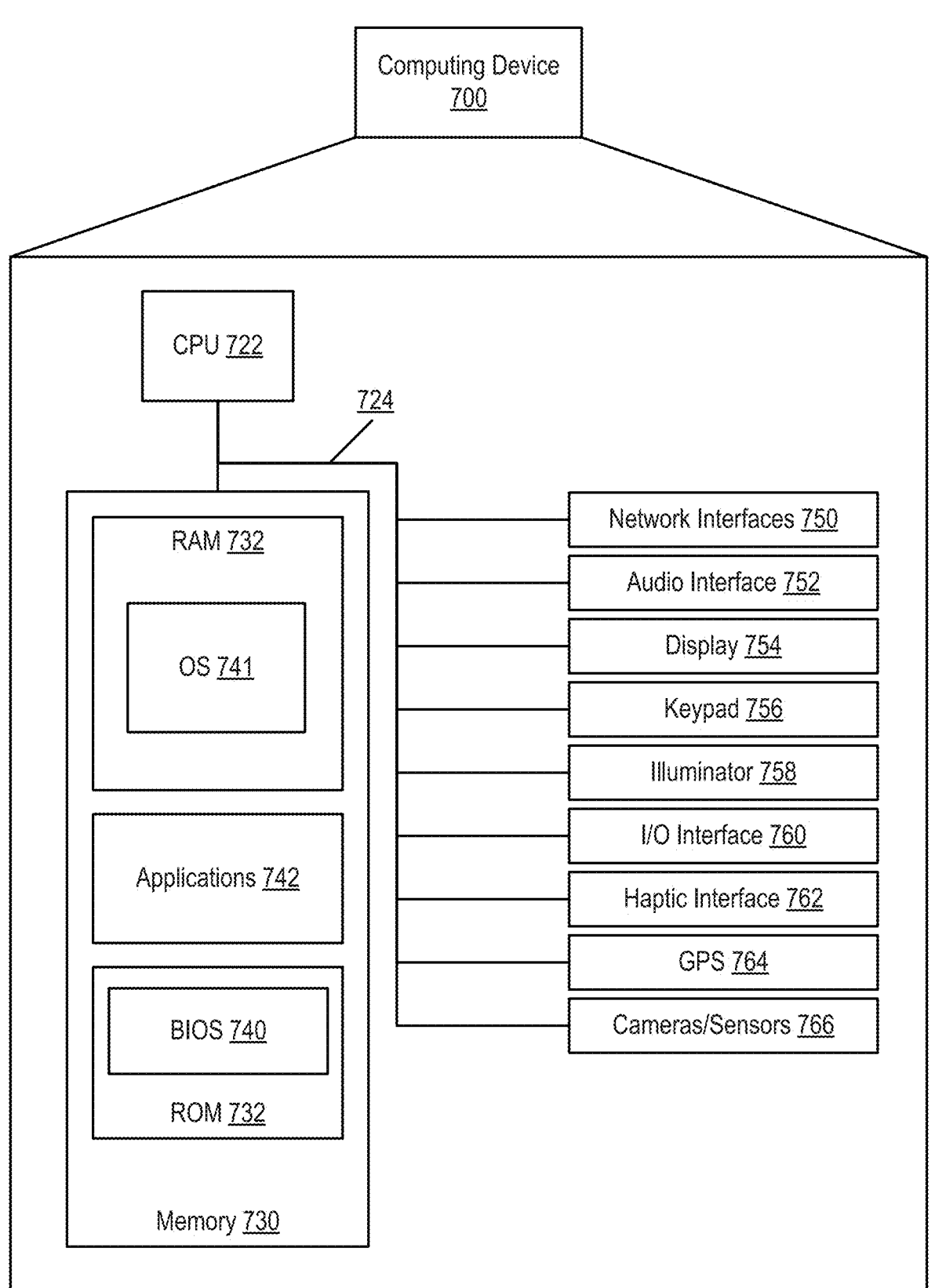
FIG. 7 is a block diagram illustrating a computing device showing an example of a client or server device used in various embodiments of the present disclosure.

FIG. 7 is a schematic diagram illustrating a client device showing an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, UE 102 discussed above at least in relation to FIG. 1.

As shown in the figure, in some embodiments, Client device 700 includes a processing unit (CPU) 722 in communication with a mass memory 730 via a bus 724. Client device 700 also includes a power supply 726, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. Power supply 726 provides power to Client device 700.

Client device 700 may optionally communicate with a base station (not shown), or directly with another computing device. In some embodiments, network interface 750 is sometimes known as a transceiver, transceiving device, or network interface card (NIC).

Audio interface 752 is arranged to produce and receive audio signals such as the sound of a human voice in some embodiments. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may include any input device arranged to receive input from a user. Illuminator 758 may provide a status indication and/or provide light.

Client device 700 also includes input/output interface 760 for communicating with external. Input/output interface 760 can utilize one or more communication technologies, such as USB, infrared, Bluetooth™, or the like in some embodiments. Haptic interface 762 is arranged to provide tactile feedback to a user of the client device.

Optional GPS transceiver 764 can determine the physical coordinates of Client device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS or the like, to further determine the physical location of client device 700 on the surface of the Earth. In one embodiment, however, Client device 700 may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of Client device 700. The mass memory also stores an operating system 741 for controlling the operation of Client device 700.

Memory 730 further includes one or more data stores, which can be utilized by Client device 700 to store, among other things, applications 742 and/or other information or data. For example, data stores may be employed to store information that describes various capabilities of Client device 700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 700.

Applications 742 may include computer executable instructions which, when executed by Client device 700, transmit, receive, and/or otherwise process audio, video, images, and enable telecommunication with a server and/or another user of another client device. Applications 742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
identifying, over a network, a multi-link operation (MLO) network connection between a set of devices, the set of devices comprising at least one client device and an access point (AP) device connected over the network via first link of the MLO network connection;
determining to perform channel availability check (CAC) operations for the network connection;
activating, based on the CAC operations determination, a second link of the MLO connection, the second link being a dormant MLO link prior to the activation;
offloading, over the network, network traffic between the at least one client device and the AP device to the second link of the MLO connection; and
execute, upon the offloading of the network traffic, the CAC operations on the first link of the MLO network connection.

2. The method of claim 1, further comprising:
determining completion of the CAC operations on the first link of the MLO network connection; and
re-routing, based on the determined completion of the CAC operations, the network traffic back to the first link of the MLO network connection.

3. The method of claim 2, further comprising:
rendering the second link of the MLO network connection dormant upon performance of the re-routing of the network traffic back to the first link of the MLO network connection.

4. The method of claim 2, wherein the re-routing is performed in accordance with regulatory compliance associated with a location of the network.

5. The method of claim 1, further comprising:
monitoring, over the network, the network connection based on at least one criteria; and
performing, based on the monitoring, the determination to perform the CAC operations.

6. The method claim 1, wherein the first link of the MLO network connection corresponds a 5 GHz frequency band.

7. The method of claim 1, wherein the second link of the MLO network connection corresponds to a 2.4 GHz frequency band.

8. The method of claim 1, wherein the second link of the MLO network connection corresponds to a 6 GHz frequency band.

9. The method of claim 1, wherein the CAC operations are performed upon initiation of the MLO network connection of the at least one client device.

10. The method of claim 1, wherein the network is a Wireless Fidelity (WiFi) 7 network at a location, the WiFi 7 network provided via the AP device.

11. A system comprising:
a processor configured to:
identify, over a network, a multi-link operation (MLO) network connection between a set of devices, the set of devices comprising at least one client device and an access point (AP) device connected over the network via first link of the MLO network connection;
determine to perform channel availability check (CAC) operations for the network connection;
activate, based on the CAC operations determination, a second link of the MLO connection, the second link being a dormant MLO link prior to the activation;
offload, over the network, network traffic between the at least one client device and the AP device to the second link of the MLO connection; and
execute, upon the offloading of the network traffic, the CAC operations on the first link of the MLO network connection.

12. The system of claim 11, wherein the processor is further configured to:
determine completion of the CAC operations on the first link of the MLO network connection; and
re-route, based on the determined completion of the CAC operations, the network traffic back to the first link of the MLO network connection.

13. The system of claim 12, wherein the processor is further configured to:
render the second link of the MLO network connection dormant upon performance of the re-routing of the network traffic back to the first link of the MLO network connection.

14. The system of claim 12, wherein the re-routing is performed in accordance with regulatory compliance associated with a location of the network.

15. The system of claim 11, wherein the processor is further configured to:
monitor, over the network, the network connection based on at least one criteria; and
perform, based on the monitoring, the determination to perform the CAC operations.

16. A non-transitory computer-readable storage medium tangibly encoded with computer-executable instructions that when executed by a processor, perform a method comprising:
identifying, over a network, a multi-link operation (MLO) network connection between a set of devices, the set of devices comprising at least one client device and an access point (AP) device connected over the network via first link of the MLO network connection;
determining to perform channel availability check (CAC) operations for the network connection;
activating, based on the CAC operations determination, a second link of the MLO connection, the second link being a dormant MLO link prior to the activation;
offloading, over the network, network traffic between the at least one client device and the AP device to the second link of the MLO connection; and execute, upon the offloading of the network traffic, the CAC operations on the first link of the MLO network connection.

17. The non-transitory computer-readable storage medium of claim 16, further comprising:

determining completion of the CAC operations on the first link of the MLO network connection; and re-routing, based on the determined completion of the CAC operations, the network traffic back to the first link of the MLO network connection.

18. The non-transitory computer-readable storage medium of claim 17, further comprising:

rendering the second link of the MLO network connection dormant upon performance of the re-routing of the network traffic back to the first link of the MLO network connection.

19. The non-transitory computer-readable storage medium of claim 17, wherein the re-routing is performed in accordance with regulatory compliance associated with a location of the network.

20. The non-transitory computer-readable storage medium of claim 16, further comprising:

monitoring, over the network, the network connection based on at least one criteria; and performing, based on the monitoring, the determination to perform the CAC operations.

\* \* \* \* \*